United States Patent [19]

Hirohata

[11] Patent Number: 4,830,560
[45] Date of Patent: May 16, 1989

[54] PLASTIC CLIP WITH RESILIENT THREAD SEGMENTS AND CYLINDRICAL CLASP

[75] Inventor: Toshio Hirohata, Yokohama, Japan
[73] Assignee: Nifco, Inc., Yokohama, Japan
[21] Appl. No.: 189,781
[22] Filed: May 3, 1988
[30] Foreign Application Priority Data
  May 11, 1987 [JP] Japan ................................. 62-112582
[51] Int. Cl.⁴ .......................................... F16B 37/08
[52] U.S. Cl. .................................. 411/433; 411/437; 411/908
[58] Field of Search ................ 411/432, 433, 437, 512, 411/907, 908, 429–431; 24/136 L, 573, 590

[56] References Cited

U.S. PATENT DOCUMENTS

| | | | |
|---|---|---|---|
| 1,879,421 | 9/1932 | Nalle | 411/433 X |
| 2,736,227 | 2/1956 | Stroble | 411/433 |
| 4,729,703 | 3/1988 | Sato | 411/433 X |
| 4,737,059 | 4/1988 | Batten | 411/437 |

FOREIGN PATENT DOCUMENTS 45-30852 10/1970 Japan ................................. 411/433
228390 6/1969 U.S.S.R. ............................. 411/433

Primary Examiner—Gary L. Smith
Assistant Examiner—Duoglas E. Ringel
Attorney, Agent, or Firm—Richard Bushnell

[57] ABSTRACT

A plastic clip to be tightened against a bolt comprises a plastic body having a base having a through hole to be penetrated vertically by the bolt, at least one upright post extending upright from the top of the base adjacent to the through hole, a cylindrical portion united to the outer end of the upright post and having a hole formed above and coaxial with the through hole in the base for receiving the bolt, and a flexible arm extending in a curved fashion from one side of the upright post between the base and the cylindrical portion to slightly project with respect to the outer shape of the cylindrical portion having a curved inner surface provided with a thread to be meshed with the male thread of the bolt, and a plastic operable cylinder fitted on the outer periphery of the cylindrical portion and lowered along the upright post to urge the flexible arm against the periphery of the bolt.

6 Claims, 3 Drawing Sheets

FIG.I

PLASTIC CLIP WITH RESILIENT THREAD SEGMENTS AND CYLINDRICAL CLASP

BACKGROUND OF THE INVENTION

1. Field of the Invention

This invention relates to a plastic clip to be tightened against a bolt for securing a work to the bolt.

2. Prior Art Statement

Plastic clips like that noted above are disclosed in Japanese Patent Public Disclosure No. SHO 52-60369, Japanese Patent Public Disclosure No. SHO 61-2912, Japanese Patent Public Disclosure No. SHO 61-59012, Japanese Utility Model Public Disclosure No. SHO 59-81872 and Japanese Utility Model Public Disclosure No. SHO 61-52710.

Each of these prior-art clips is fitted on and pushedly tightened against a bolt. However, a great force is required for tightening the bolt by pushing. Further, to remove the clip once mounted on the bolt, the clip has to be turned like a nut. Therefore, the removal of the clip is rather cumbersome.

OBJECT AND SUMMARY OF THE INVENTION

An object of the invention is to provide a plastic clip, which can be smoothly tightened against a bolt meeting minimal resistance and can be readily removed from the bolt for re-use.

According to the invention, there is provided a plastic clip to be tightened against a bolt, which comprises:

a plastic body having a base having a through hole to be penetrated vertically by the bolt, at least one upright post extending upright from the top of the base adjacent to the through hole, a cylindrical portion united to the outer end of the upright post and having a hole formed above and coaxial with the through hole in the base for receiving the bolt, and a flexible arm extending in a curved fashion from one side of the upright post between the base and the cylindrical portion to slightly project with respect to the outer shape of the cylindrical portion and having a curved inner surface provided with a thread to be meshed with the male thread of the bolt; and a plastic operable cylinder fitted on the outer periphery of the cylindrical portion and lowered along the upright post to urge the flexible arm against the periphery of the bolt.

To tighten the clip having the above construction against a bolt, the through hole formed in the base and hole formed in the cylindrical portion are fitted on the bolt with the operable cylinder fitted on the outer periphery of the cylindrical portion. Then, the operable cylinder is lowered from the outer periphery of the cylindrical portion along the upright portion. In consequence, the inner periphery of the operable cylinder is brought into frictional contact with the outer surface of the flexible arm to cause inward flexing thereof so as to bring the thread on the curved inner surface of the flexible arm into mesh sidewise with the male thread of the bolt. Thus the clip is tightened against the bolt.

To remove the clip from the bolt, the operable cylinder is raised along the upright post into engagement with the outer periphery of the cylindrical portion.

The thread of the flexible arm is in mesh with the male thread of the bolt only when the inner surface of the operable cylinder is in frictional contact with the outer surface of the flexible arm. Thus, the clip can be readily tightened against and removed from the bolt.

The above and other objects and features of the invention will become more apparent from the following detailed description with reference to the accompanying drawings.

DETAILED DESCRIPTION OF THE PREFERRED EMBODIMENTS

Figure 1:
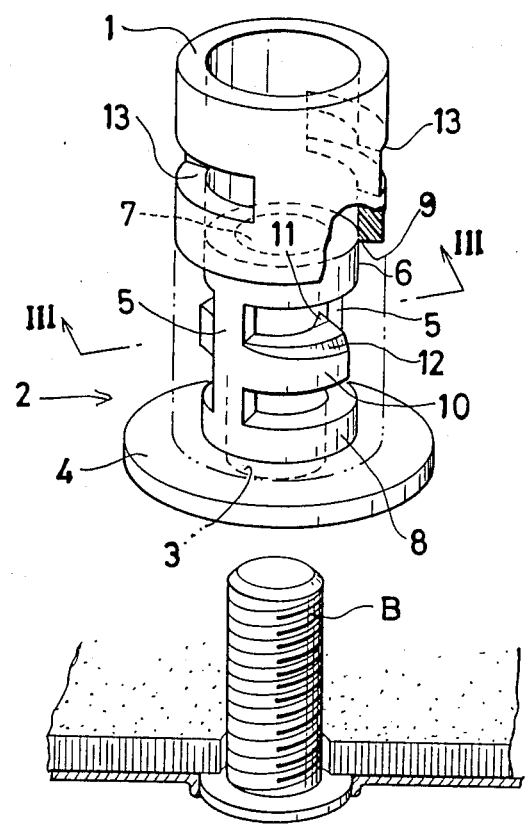
FIG. 1 is a perspective view showing an embodiment of the clip according to the invention.

FIGS. 1 to 4 show a first embodiment of the plastic clip according to the invention. Referring to the Figures, reference numeral 1 designates an operable cylinder, and numeral 2 designates a body. These components are molded from a plastic material.

The body 2 has a base 4 having a through hole 3, through which a bolt B is passed, two upright posts 5 extending upright in face-to-face relation to each other from the top of the base 4 adjacent to the through hole 3 and a cylindrical portion 6 secured to the top of the two upright posts 5. The cylindrical portion 6 has a hole 7 open at its bottom and coaxial with the through hole 3 in the base 4, so that the bolt B can be received in the hole 7.

The through hole 3 in the base 4 and hole 7 in the cylindrical portion 6 need not be circular in shape and may, for example, be rectangular.

The top of the base 4 has an annular ridge-like portion 8 surrounding the through hole 3 and having the same outer shape as the cylindrical portion 6. The upright posts 5 extend from the ridge-like portion 8.

The operable cylinder 1 may be molded separately from the body 2 and fitted on the outer periphery of the cylindrical portion 6. In the illustrated embodiment, however, the operable cylinder 1 is united via a reduced-wall portion 9 to the top of the outer periphery of the cylindrical portion 6, and in use it is fitted on the cylindrical portion 6 by striking it from above with a hammer or the like so as to break the reduced-wall portion 9.

Figure 2:
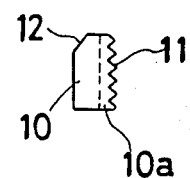
FIG. 2 is an end view showing a flexible arm of the clip shown in FIG. 1.
Figure 3:
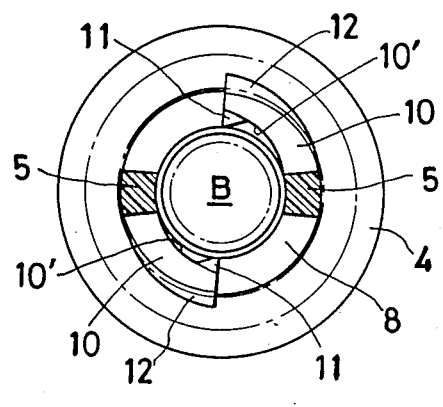
FIG. 3 is a sectional view taken along line III—III in FIG. 1.
Figure 4:
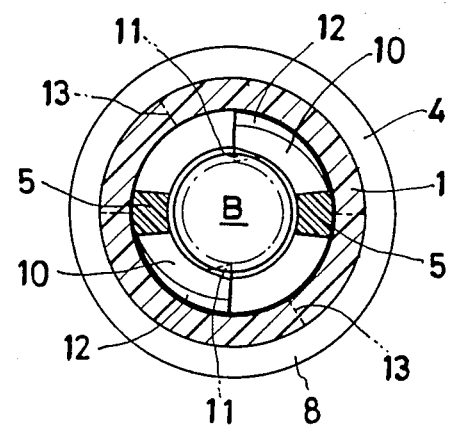
FIG. 4 is a sectional view showing the clip with an operable cylinder lowered.

In the embodiment shown in FIGS. 1 to 4, a curved flexible arm 10 extends in the counterclockwise (or clockwise) direction from one side of each upright post 5. Each flexible arm 10 has a curved concave inner surface 10' which is slightly spaced apart from the outer periphery of the bolt B, and the entire inner surface or a free end portion 10a of the arm 10 is provided with a thread 11 to be meshed with the male thread of the bolt B, as shown in FIG. 2. The convex outer surface of the flexible arm 10 projects slightly outward from the outer periphery of the cylindrical portion 6 and ridge-like portion 8, and its upper portion is formed with an outwardly downward cam-like surface 12.

In the use of this plastic clip, the bolt B is welded to a floor panel of a vehicle body such that it projects upright, then a carpet is laid on the floor panel by fitting a hole thereof on the bolt B, and a portion of the carpet surrounding the hole is urged against the floor panel by tightening the clip against the bolt B. To this end, the through hole 3 of the base 4 and hole 7 of the cylindrical portion 6 are fitted on the bolt B from above with the operable cylinder 1 fitted on the outer periphery of the cylindrical portion 6, and the carpet is urged against the floor panel with the lower surface of the base 4. This operation can be effected by merely urging the carpet against the floor panel, for the flexible arms 10 project outwardly as noted before and their threads 11 are not in contact with the bolt B.

Subsequently, the operable cylinder 1 is pushed down until it is brought into contact with the top surface of the base 4. In this operation, the lower end of the inner periphery of the operable cylinder 1 rides on the cam-like surface 12 of each flexible arm 10 and pushes the flexible arm 10 inwardly to be in frictional contact with the outer surface of the flexible arm 10. Thus, the upper end of the inner periphery of the operable cylinder 1 is fitted on the upper end of the outer periphery of the cylindrical portion 6, and the lower end of the inner periphery of the operable cylinder 1 is fitted on the outer periphery of the ridge-like portion 8. Further, the thread 11 of each inwardly pushed flexible arm 10 is meshed with the corresponding thread of the bolt B.

In this way, the carpet is held urged against the floor panel by the bottom surface of the base 4.

For removing the carpet from the bolt B, the operable cylinder 1 is pulled up to be fitted on the cylindrical portion 6. As a result, each flexible arm 10 outwardly flexes by its own elasticity so that the thread 11 is separated from the bolt B. Thus, the body 2 can be removed upwards from the bolt B, and then the carpet can be removed.

In this embodiment, the cylindrical wall of the operable cylinder 1 is provided with windows 13 extending in the circumferential direction to permit the pair of flexible arms 10 to be separated from the bolt B. Therefore, instead of merely pulling up the operable cylinder 1 for the removal of the carpet, the operable cylinder 1 may first be turned to bring the windows 13 to the position occupied by the flexible arms 10 so that the flexible arms 10 are outwardly flexed into the windows 13 by the elastic restoring force, thus separating the threads 11 from the bolt B, and then it may be upwardly pulled away from the bolt B.

To use the clip again, the body 2 is fitted on a bolt from above, and then the operable cylinder 1 is pushed down or turned in the direction in which the flexible arms 10 extend from the upright posts 5.

The windows 13 may be replaced with circumferential grooves formed in the inner peripheral surface of the operable cylinder 1.

Figure 5:
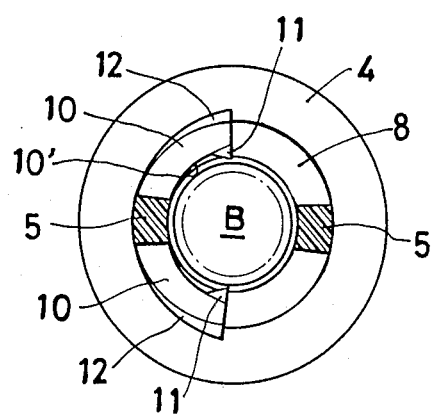
FIG. 5 is a view similar to FIG. 3 but showing a different embodiment of the clip according to the invention.
Figure 6:
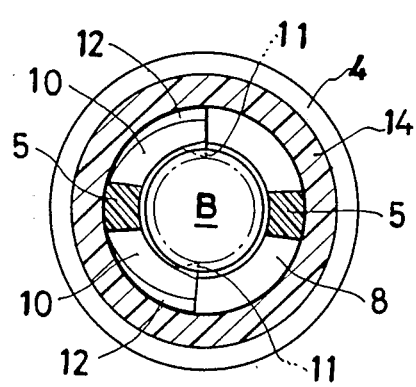
FIG. 6 is a view similar to FIG. 4 but showing the embodiment of FIG. 5
Figure 7:
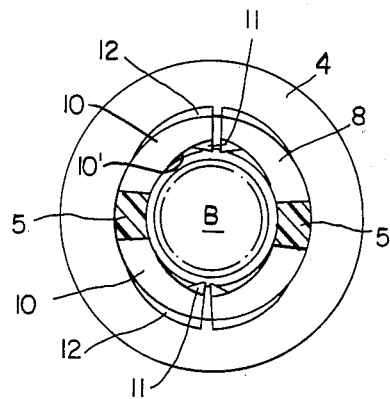
FIG. 7 is a sectional view showing the clip in an embodiment which has four flexible arms.

In the above embodiment, the flexible arms 10 are provided such that each of them extends in the counterclockwise direction from one side of each of the two opposed upright posts 5 extending from the base 4 adjacent to the through hole 3. However, this is by no means limiting; flexible arms 10 may be provided such that they extend from the opposite sides of one of the two upright posts, as shown in FIG. 5, or from the opposite sides of the two upright posts (as shown in FIG. 7). In these two alternative embodiments, the operable cylinder is not formed with any window 13. If windows 13 were provided in these embodiments for the flexible arms 10, the free end of one or the other of the flexible arms 10 extending from the opposite sides of the upright post 5 would be caught in a window 13 when it is intended to turn the operable cylinder 1 in order to let the flexible arms 10 be outwardly flexed into the windows 13. Therefore, in these embodiments as shown in FIG. 6, a windowless operable cylinder 14 is used and is merely pulled up when removing the clip from the bolt. The other structural features of the embodiments of FIG. 5 and FIG. 6 are the same as in the embodiment shown in FIGS. 1 to 4. Thus, like parts are designated by like reference numerals, and their description is omitted.

Further, in the previous embodiment the hole 7 in the cylindrical portion 6 was a blind bore closed at the top so as to conceal the upper end of the bolt B, but a through hole which is open at the top may be formed in place of the hole 7.

While the above description of the embodiments relates to a clip according to the invention used for urging a carpet against a floor panel of a vehicle body by tightening it against a bolt projecting upright from the floor panel, this application is by no means limiting. For example, it is possible to use the clip according to the invention instead for securing an insulator to a dashboard or to a panel in the engine room, or for securing a pipe, a harness, a harness protector, etc. inside the engine room or passenger compartment as well as for various other purposes.

With the clip according to the invention, after fitting it on a bolt the operable cylinder is pushed down to cause inward flexing of the flexible arms so as to mesh the threads thereof sidewise with the male thread of the bolt. Therefore, the clip can be readily tightened against the bolt meeting minimal resistance. In addition, the clip can be readily removed from the bolt for re-use.

What is claimed is:

1. A plastic clip to be tightened against a bolt comprising:
    a plastic body having a base having a through hole to be penetrated vertically by said bolt, at least one upright post extending upright from the top of said base adjacent to said through hole, a cylindrical portion united to the outer end of said upright post and having a hole formed above and coaxial with said through hole in said base for receiving said bolt, and a flexible arm extending in a curved fashion from one side of said upright post between said base and said cylindrical portion to slightly project with respect to the outer shape of said cylindrical portion and having a curved inner surface provided with a thread to be meshed with the male thread of said bolt; and
    a plastic operable cylinder fitted on the outer periphery of said cylindrical portion and lowered along said upright post to urge said flexible arm against the periphery of said bolt.

2. The plastic clip according to claim 1, wherein said flexible arm has an outer surface having an upper portion formed with an outwardly downwardly inclined cam-like surface.

3. The plastic clip according to claim 1, wherein said operable cylinder has the peripheral wall formed with a window into which a free end portion of said flexible arm is to be outwardly flexed.

4. The plastic clip according to claim 1, wherein said operable cylinder is united via a reduced-wall portion to the upper end of the outer periphery of said cylindrical portion.

5. The plastic clip according to claim 1, wherein said plastic body includes two upright posts extending upright and in an opposing fashion from the top of said base adjacent to said through hole and a pair of flexible arms each extending in like direction from each of said upright posts.

6. The plastic clip according to claim 1, wherein said plastic body includes two upright posts extending upright and in an opposing fashion from the top of said base adjacent to said through hole and a pair of flexible arms extending from the opposite sides of at least one of said upright posts.

* * * * *